United States Patent
Matsushita

(10) Patent No.: US 7,930,442 B2
(45) Date of Patent: Apr. 19, 2011

(54) INFORMATION PROCESSING APPARATUS AND INFORMATION PROCESSING SYSTEM NOTIFYING INFORMATION OF OPTIONAL DEVICES

(75) Inventor: Hideki Matsushita, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 143 days.

(21) Appl. No.: 12/322,206

(22) Filed: Jan. 30, 2009

(65) Prior Publication Data

US 2009/0210575 A1 Aug. 20, 2009

(30) Foreign Application Priority Data

Feb. 15, 2008 (JP) ................................ 2008-034176

(51) Int. Cl.
G06F 3/00 (2006.01)
G06F 13/12 (2006.01)
G06F 3/14 (2006.01)

(52) U.S. Cl. ................ 710/19; 710/16; 710/17; 710/18; 710/62; 715/705; 715/864

(58) Field of Classification Search .................. None
See application file for complete search history.

(56) References Cited

U.S. PATENT DOCUMENTS

| 5,706,411 | A | * | 1/1998 | McCormick et al. ........ 358/1.14 |
| 7,143,150 | B1 | * | 11/2006 | Nuggehalli ................... 709/221 |
| 2002/0140725 | A1 | | 10/2002 | Horii | |
| 2006/0248476 | A1 | | 11/2006 | Yamada | |
| 2007/0204029 | A1 | * | 8/2007 | Igarashi et al. ................ 709/223 |

FOREIGN PATENT DOCUMENTS

| JP | 11-348380 A | 12/1999 |
| JP | 2000-276272 | 10/2000 |
| JP | 2002-063007 A | 2/2002 |
| JP | 2002-175258 A | 6/2002 |
| JP | 2005-072982 A | 3/2005 |
| JP | 2006-309741 A | 11/2006 |
| JP | 2007-066081 | 3/2007 |

* cited by examiner

*Primary Examiner* — Alan Chen
(74) *Attorney, Agent, or Firm* — Edwards Angell Palmer & Dodge LLP; David G. Conlin; David A. Tucker

(57) ABSTRACT

In an information processing apparatus performing data communication through a network with an image forming apparatus to which a plurality of optional devices are additionally mounted, a CPU obtains device/apparatus data related to specification of optional devices from the image forming apparatus, and based on the obtained device/apparatus data, determines whether or not there is any optional device of which specification has been changed. If it is determined that there is an optional device of which specification has been changed, the CPU causes a display, displaying appearance images of the image forming apparatus and optional devices, to display the appearance image of the corresponding optional device in a pulsating manner.

7 Claims, 14 Drawing Sheets

INFORMATION PROCESSING APPARATUS AND INFORMATION PROCESSING SYSTEM NOTIFYING INFORMATION OF OPTIONAL DEVICES

CROSS-REFERENCE TO RELATED APPLICATION

This nonprovisional application claims priority under 35 U.S.C. §119(a) on Patent Application No. 2008-034176 filed in Japan on Feb. 15, 2008, the entire contents of which are hereby incorporated by reference.

BACKGROUND OF THE INVENTION

1. Field of the Invention

The present invention relates to an information processing apparatus connected through a network to a terminal apparatus to which an optional device can be attached. More specifically, the present invention relates to information processing apparatus and information processing system that display information of the optional device on a display provided on the information processing apparatus in a way easy to understand.

2. Description of the Background Art

Development in computer equipment and communication technique as fundamentals of computer network in recent years brought about highly reliable computer networks capable of high speed communication. Appearance of such networks leads to wider variety of devices connectable to the networks. Accordingly, network management software enabling efficient management of various devices has been developed vigorously. Information of various devices on the network can be obtained by using the network management software.

For instance, in a computer connected through a network to a printer, a printer driver is installed to attain appropriate operation of the printer. When one uses such a conventional computer and specification of an optional device as a peripheral device to the the printer is changed, for example, when a device is exchanged, removed or newly added, one must go through a troublesome operation of newly installing a corresponding printer driver.

A solution to the above-described problem is disclosed in Japanese Patent Laying-Open No. 2002-175258 (hereinafter referred to as "'258 application"). In the technique disclosed in '258 application, a core module of a printer driver automatically obtains option information, loads an option-dependent module corresponding to the obtained option information, and forms a module that operates as a driver corresponding to the option information.

The technique disclosed in '258 application is convenient as the printer driver corresponding to the option information is automatically installed. The user, however, cannot recognize any change in specification of the optional device. Therefore, the user may be confused when he/she encounters an inconvenience caused by the change in specification of the optional device, for example, when a certain function suddenly becomes unavailable.

As one possible solution to such a problem, appearance images of the printer and the optional device may be displayed on a display screen or the like provided on the printer, to notify the user of information related to the state, operation and setting situations of the printer. It may be difficult by this method, however, for the user to grasp what change has been made to the specification of the optional device.

It is also possible to display the appearance image of optional device with its color changed, to notify the user that change has been made to the specification of the optional device. It is impossible, however, for a user having difficulty in determining color difference because of some defect in color perception to know the change in specification of the optional device.

SUMMARY OF THE INVENTION

The present invention was made in view of the problems described above, and its object is to provide an information processing apparatus and information processing system that allow the user to easily know any change in specification of an optional device.

According to an aspect, the present invention provides an information processing apparatus performing data communication through a network with a terminal wherein a single or a plurality of optional devices are additionally mounted to the terminal, the apparatus including: an information obtaining device obtaining, from the terminal, information related to specification of an optional device mounted on the terminal; a determining device determining, based on the obtained information, whether or not there is any optional device of which specification has been changed; a display displaying appearance images of the terminal and the optional device mounted on the terminal; and a display processing device displaying, on the display, when it is determined by the determining device that there is an optional device of which specification has been changed, appearance image of the optional device with image attribute changed with time.

The information obtaining device obtains information related to the specification of optional device mounted on the terminal, from the terminal, and the determining device determines, based on the obtained information, whether or not there is any optional device of which specification has been changed. If it is determined by the determining device that there is an optional device of which specification has been changed, the display processing device displays, on the display displaying appearance images of the terminal and optional devices mounted on the terminal, the appearance image of the corresponding optional device with image attribute changed with time. Consequently, the optional device of which specification has been changed comes to be displayed in a highly visible, emphasized manner and, therefore, the user can easily know that the specification of the optional device has been changed. Therefore, the problem that the user may be confused when he/she encounters an inconvenience caused by the change in specification of the optional device, for example, when a certain function suddenly becomes unavailable, can be avoided, and convenience to the user can be improved.

Preferably, the display processing device includes a first display circuit displaying, on the display, when it is determined by the determining device that there is an optional device of which specification has been changed, appearance image of the optional device with its size changed with time.

Consequently, the optional device of which specification has been changed comes to be displayed in a highly visible, emphasized manner and, therefore, the user, particularly, a user having difficulty in determining color difference because of some defect in color perception, can more easily know that the specification of the optional device has been changed.

More preferably, the display processing device further includes a second display circuit displaying, on the display, when it is determined by the determining device that there is an optional device of which specification has been changed, appearance image of the optional device so as to repeat a display operation in which appearance image of the optional device is increased in size at a prescribed rate until it reaches a prescribed size.

Consequently, the optional device of which specification has been changed comes to be displayed in a highly visible, emphasized manner and, therefore, the user, particularly, a user having difficulty in determining color difference because of some defect in color perception, can more easily know that the specification of the optional device has been changed.

More preferably, the display processing device further includes a third display circuit displaying, on the display, when it is determined by the determining device that there is an optional device of which specification has been changed, appearance image of the optional device with its display attribute changed along with the change in size of the appearance image.

Consequently, the optional device of which specification has been changed comes to be displayed in a highly visible, emphasized manner and, therefore, the user can more easily know that the specification of the optional device has been changed.

More preferably, the display processing device further includes a fourth display circuit displaying, on the display, when it is determined by the determining device that there is an optional device of which specification has been changed, appearance image of the optional device with its display rate made different in accordance with type of the optional device.

Therefore, noticing the difference in display rate, the user, particularly, a user having difficulty in determining color difference because of some defect in color perception, can easily know the type of the optional device of which specification has been changed.

More preferably, the terminal is an image forming apparatus, and the optional device is at least any one of a paper feed cassette, a large capacity tray, an automatic scanner feeder and a paper discharge device.

Consequently, the paper feed cassette, the large capacity tray, the automatic scanner feeder or the paper discharge device of which specification has been changed comes to be displayed in a highly visible, emphasized manner and, therefore, the user can more easily know that the specification of the optional device has been changed. Therefore, the problem that the user may be confused when he/she encounters an inconvenience caused by the change in specification of the optional device, for example, when a certain function suddenly becomes unavailable, can be avoided, allowing smooth execution of the print job by the user.

More preferably, the information processing apparatus further includes a pointing device for performing an input operation to the information processing apparatus, and the display processing device further includes a stopping circuit stopping, when appearance image of the optional device displayed with its image attribute changed with time is clicked by the pointing device, display by the display of the appearance image of the optional device with its image attribute changed with time.

Thus, it is confirmed that the user is aware of the change in specification of the optional device. As a result, the user may not be confused when he/she encounters an inconvenience caused by the change in specification of the optional device, for example, when a certain function suddenly becomes unavailable, and he/she can proceed to the next step of processing.

According to another aspect, the present invention provides an information processing system including: a terminal to which a single or a plurality of optional devices are additionally mounted; and an information processing apparatus performing data communication with the terminal through a network; wherein the information processing apparatus includes an information obtaining device obtaining, from the terminal, information related to specification of an optional device mounted on the terminal, a determining device determining, based on the obtained information, whether or not there is any optional device of which specification has been changed, a display displaying appearance images of the terminal and the optional device mounted on the terminal, and a display processing device displaying, on the display, when it is determined by the determining device that there is an optional device of which specification has been changed, appearance image of the optional device with image attribute changed with time. The terminal includes an information providing device transmitting the information to the information processing apparatus.

The information obtaining device of the information processing apparatus obtains information related to the specification of optional device mounted on the terminal from the information providing device of the terminal, and the determining device determines, based on the obtained information, whether there is any optional device of which specification has been changed. If it is determined by the determining device that there is an optional device of which specification has been changed, the display processing device displays, on a display displaying appearance images of the terminal and optional devices mounted on the terminal, the appearance image of the corresponding optional device with image attribute changed with time. Consequently, the optional device of which specification has been changed comes to be displayed in a highly visible, emphasized manner and, therefore, the user can easily know that the specification of the optional device has been changed. Therefore, the problem that the user may be confused when he/she encounters an inconvenience caused by the change in specification of the optional device, for example, when a certain function suddenly becomes unavailable, can be avoided, and convenience to the user can be improved.

According to a further aspect, the present invention provides a computer program in a computer performing data communication through a network with a terminal, wherein a single or a plurality of optional devices are additionally mounted to the terminal, the computer program causing the computer to function as an information obtaining device obtaining, from the terminal, information related to specification of an optional device mounted on the terminal, a determining device determining, based on the obtained information, whether or not there is any optional device of which specification has been changed, a display displaying appearance images of the terminal and the optional device mounted on the terminal, and a display processing device displaying, on the display, when it is determined by the determining device that there is an optional device of which specification has been changed, appearance image of the optional device with image attribute changed with time.

When the computer program having the structure as above is executed, the optional device of which specification has been changed comes to be displayed in a highly visible, emphasized manner and, therefore, the user can easily know that the specification of the optional device has been changed. Therefore, the problem that the user may be confused when he/she encounters an inconvenience caused by the change in specification of the optional device, for example, when a certain function suddenly becomes unavailable, can be avoided, and convenience to the user can be improved.

According to a still further aspect, the present invention provides a computer readable recording medium recording the computer program described above.

As to the recording medium, an RAM (Random Access Memory) or an ROM (Read Only Memory) forming the main memory or auxiliary memory inside the computer, or a hard disk drive (HDD) as an auxiliary storage, may be used. Alternatively, a program reading device may be provided as an external storage to the computer, and the recording medium may be one that is readable when loaded to the device. Typically, a CPU (Central Processing Unit) reads the computer program from a storage medium other than the main memory, loads the read computer program to the main memory, and executes the program. The CPU generally controls various units of the computer so that prescribed process is performed in accordance with the installed computer program.

Examples of the recording medium that can be read by the program reading device may be media that can fixedly record a program, including (1) tapes such as a magnetic tape and a cassette tape, (2) disks such as a magnetic disc including flexible disk (FD) and hard disk (HD), or optical disk including a CD-ROM (Compact Disc-Read Only Memory), MO (Magento-Optical Disk), MD (Mini Disk) and DVD (Digital Versatile Disk) (3) cards such as an optical card and an IC (Integrated Circuit) card including a memory card, and (4) semiconductor memories such as a mask ROM, EPROM (Erasable Programmable Read Only Memory), EEPROM (Electrically Erasable Programmable Read Only Memory) and a flash memory.

Further, the computer may be configured to allow connection to a communication network including the Internet, and the medium may carry the program in a non-fixed manner, with the computer program downloaded from the communication network. When the computer program is to be downloaded from the communication network, the downloading program may be stored in advance in the computer, or it may be installed from a different recording medium.

According to the present invention, the appearance image of the optional device, of which specification has been changed, is displayed with image attribute changed with time. Consequently, the optional device of which specification has been changed comes to be displayed in a highly visible, emphasized manner and, therefore, the user can easily know that the specification of the optional device has been changed. Therefore, the problem that the user may be confused when he/she encounters an inconvenience caused by the change in specification of the optional device, for example, when a certain function suddenly becomes unavailable, can be avoided, and convenience to the user can be improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
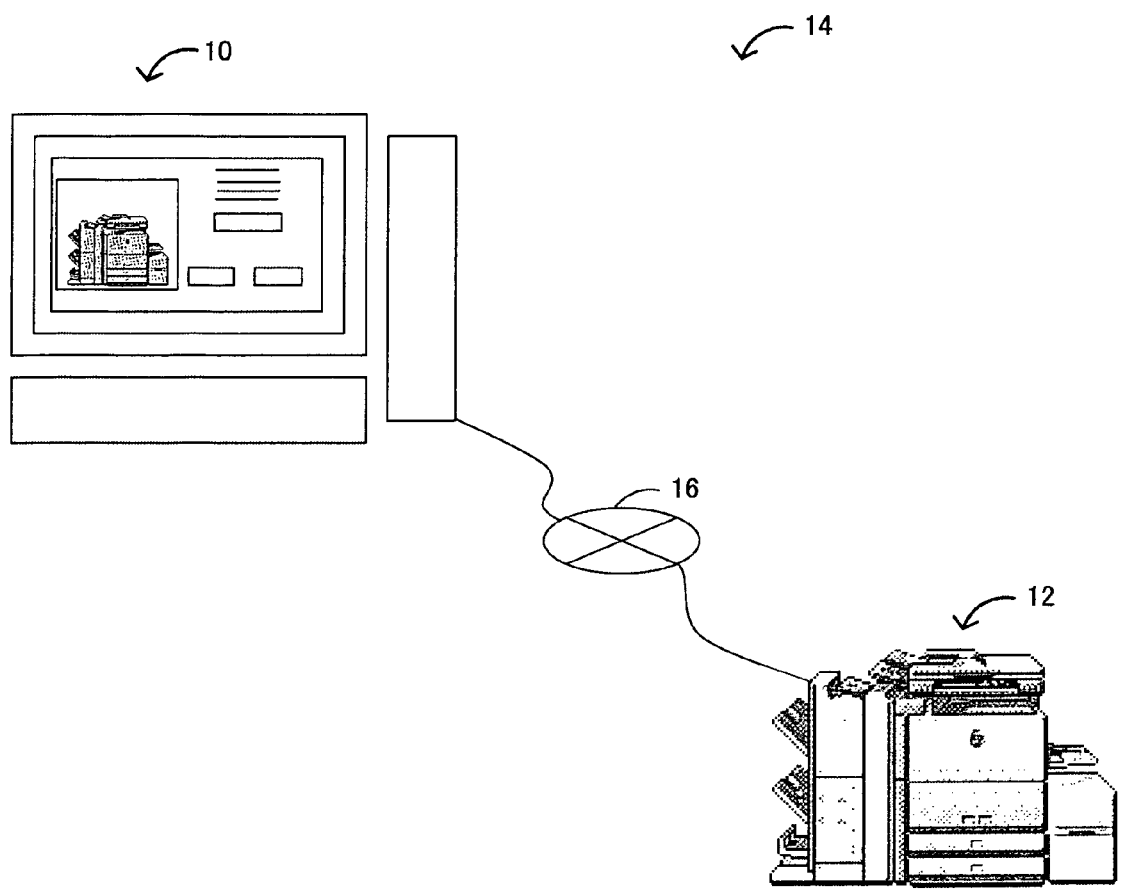
FIG. 1 schematically shows a configuration of an information processing system in accordance with an embodiment of the present invention.

In the following description and in the drawings, the same components are denoted by the same reference characters. Their names and functions are also the same. Therefore, detailed description thereof will not be repeated.

Referring to FIG. 1, an information processing system 14 includes an information processing apparatus 10 and an image forming apparatus 12 connected to each other through a network 16 implemented by LAN (Local Area Network). Information processing apparatus 10 and image forming apparatus 12 can transmit/receive various data to/from each other through network 16.

In information processing system 14, when a print instruction is issued from information processing apparatus 10 to image forming apparatus 12, image forming apparatus 12 executes a print job, in response to the print instruction.

<Hardware Configuration>

[Information Processing Apparatus 10]

Figure 2:
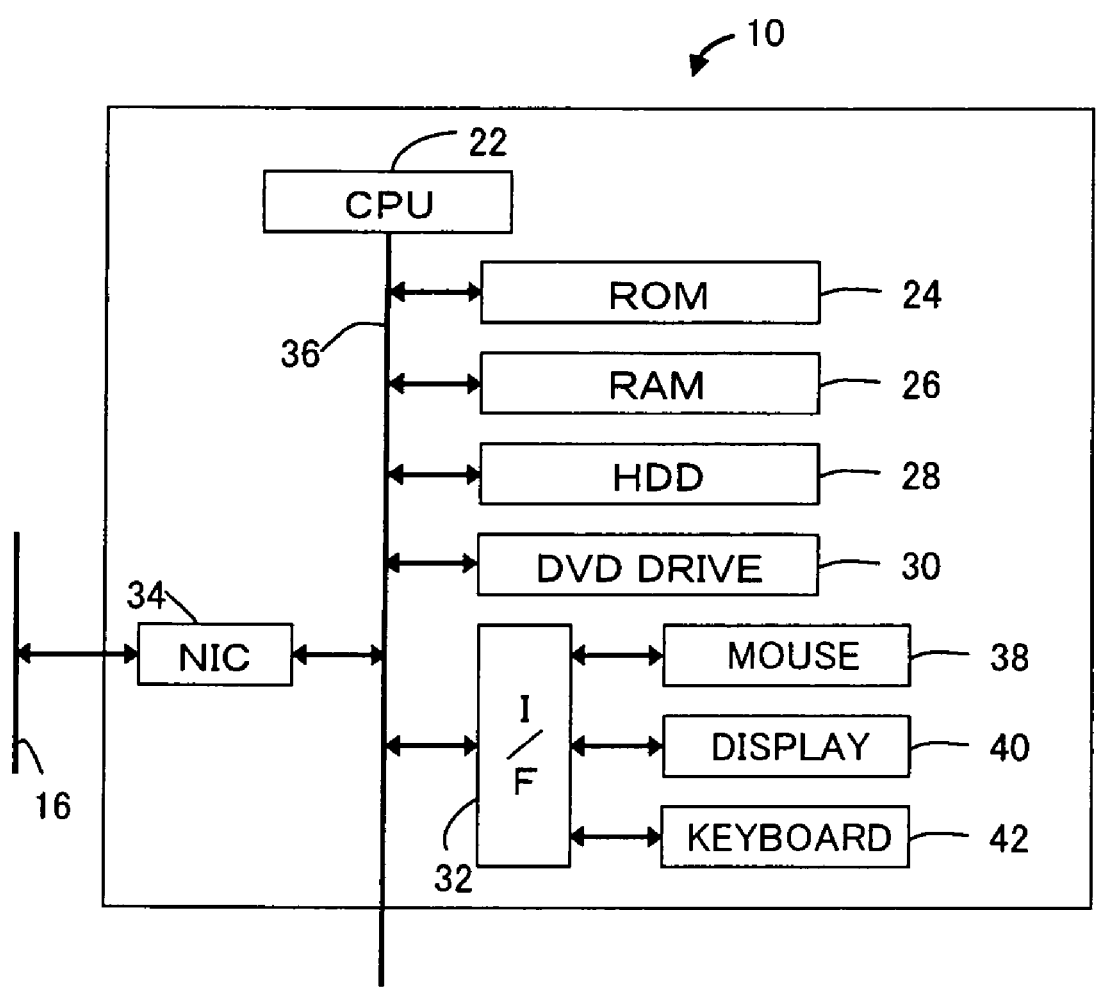
FIG. 2 is a block diagram showing hardware configuration of an information processing apparatus.

Referring to FIG. 2, information processing apparatus 10 is a computer such as a personal computer (hereinafter denoted as "PC"). Information processing apparatus 10 includes a CPU 22, an ROM 24, an RAM 26, an HDD (Hard Disk Drive) 28, a DVD drive 30, an interface (I/F) 32 for input/output device, and an NIC (Network Interface Card) 34.

To CPU 22, a BUS line 36 is connected, and to BUS line 36, ROM 24, RAM 26, HDD 28, DVD drive 30, I/F 32, and NIC 34 are connected. To I/F 32, a mouse 38 as a pointing device, a display 40 implemented by a CRT (Cathode Ray Tube) display or a liquid crystal display, and a keyboard 42 as an input device for character input are connected. Display 40 displays result of processing by the computer, including the appearance images of optional devices and appearance image of terminal on network 16, as will be described later. Information processing apparatus 10 is connected to network 16 through NIC 34, and capable of communication with image forming apparatus 12 on the network 16.

CPU 22 executes various computer programs to execute desired processes including the print job of image forming apparatus 12 and communication with image forming apparatus 12. The various computer programs are stored in advance in ROM 24 or HDD 28 and, when the desired process is executed, read from ROM 24 or HDD 28 and transferred to RAM 26. CPU 22 reads and interprets a program instruction from an address in RAM 26 designated by a value stored in a register, called a program counter, not shown, in CPU 22. Further, CPU 22 reads data necessary for the operation from an address designated by the read instruction, and executes the operation corresponding to the instruction on the data. The result of execution is also stored in an address designated by the instruction, in RAM 26, HDD 28, the register in CPU 22, or the like.

In the present embodiment, HDD 28 stores a printer driver including a computer program for executing a print job of image forming apparatus 12. The printer driver is provided, for example, by a DVD as a recording medium on which the printer driver is recorded. Specifically, the DVD as the recording medium recording the printer driver is loaded to DVD drive 30 provided in information processing apparatus 10, and the printer driver is read from the DVD and installed to HDD 28. The printer driver may be provided by a recording medium other than the DVD mentioned above, or by a communication line. The program structure for realizing the print job of image forming apparatus 12 in the printer driver will be described later.

[Image Forming Apparatus 12]

Figure 3:
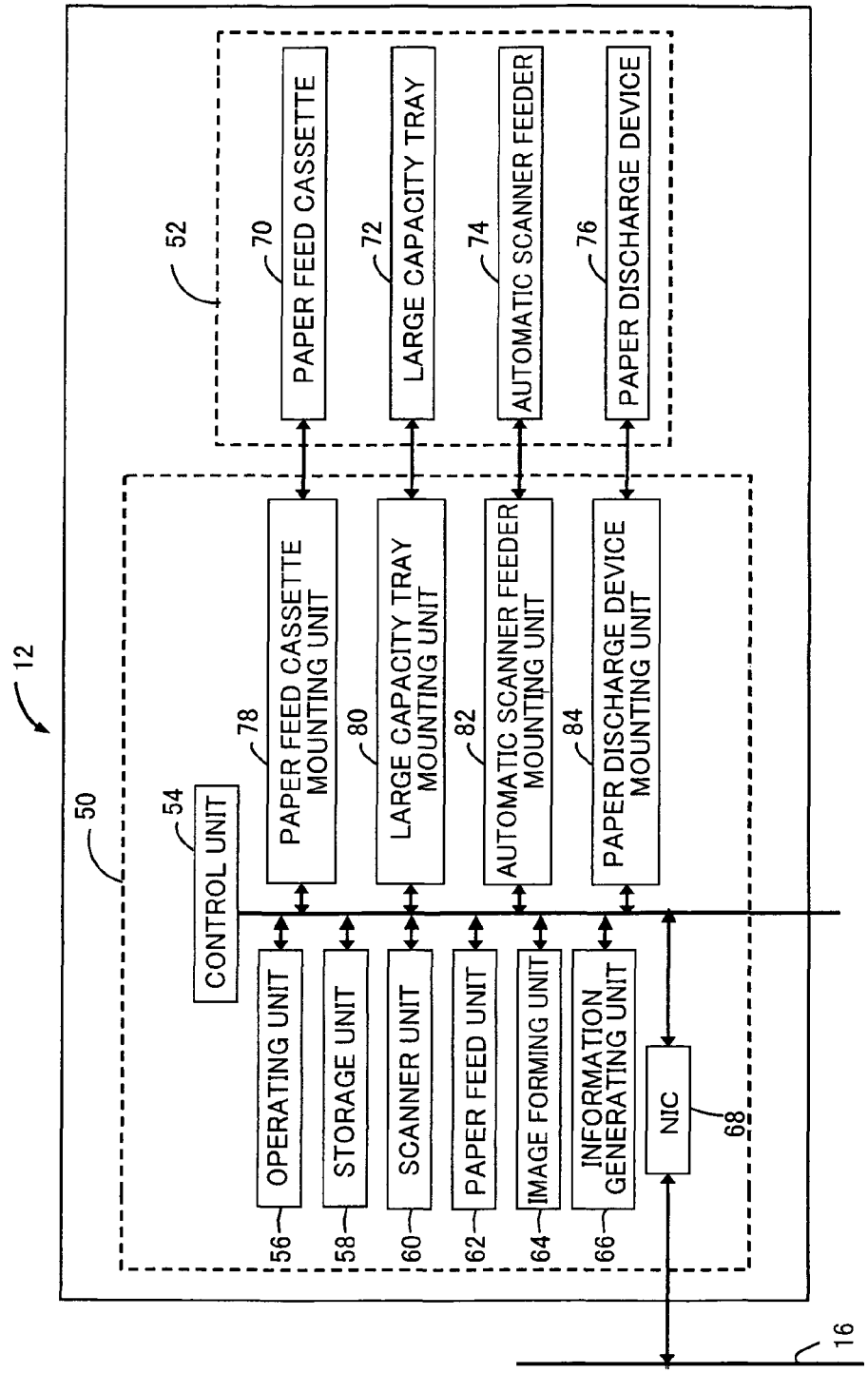
FIG. 3 is a block diagram showing an overall configuration of an image forming apparatus.

Referring to FIG. 3, image forming apparatus 12 is, by way of example, an electro-photographic type MFP (Multifunction Printer) including copy, printer and facsimile functions. Image forming apparatus 12 includes a main body 50 as a terminal of network 16, and a plurality of optional devices 52 additionally mounted to prescribed positions of main body 50.

(Main Body 50)

Main body 50 includes a control unit 54, an operating unit 56, a storage unit 58, a scanner unit 60, a paper feed unit 62, an image forming unit 64, an information generating unit 66, and an NIC 68. Main body 50 further includes a paper feed cassette mounting unit 78, a large capacity tray mounting unit 80, an automatic scanner feeder mounting unit 82, and a paper discharge device mounting unit 84. These mounting units are electrically and mechanically connected to paper feed cassette 70, large capacity tray 72, automatic scanner feeder 74 and paper discharge device 76 as the plurality of optional devices 52.

Control unit 54 includes a CPU. Control unit 54 executes various computer programs in accordance with instructions from operating unit 56 and the like, and thereby controls operations of various portions of image forming apparatus 12.

Operating unit 56 is formed of an operation panel having a display such as a liquid crystal display overlapped with an input device such as a touch panel. Operating unit 56 receives a user instruction related to an operation of image forming apparatus 12 as a whole, displays the contents of the instruction, and outputs a control signal in accordance with the instruction to control unit 54.

Storage unit 58 includes an HDD and an ROM. Storage unit 58 stores various computer programs executed by control unit 54, a main body ID identifying the main body 50, appearance image data of main body 50, device/apparatus state data representing the apparatus state of main body 50 and so on.

Scanner unit 60 includes an optical system having a document operation unit, an optical lens, and a CCD (Charge Coupled Device) line sensor. Scanner unit 60 optically reads a document when the document is copied or scanned, and generates an image signal.

Paper feed unit 62 feeds a sheet of recording paper fed from cassette 70 or tray 72 to image forming unit 64.

Image forming unit 64 includes a photo receptor, a charging device, a laser scanning unit (LSU), a developer, a transfer unit, a cleaning device and a fixing device (all not shown). Image forming unit 64 forms an image based on image data, on a sheet of recording paper fed from paper feed unit 62, in accordance with an instruction from control unit 54 or the like. The image data may include image data formed by performing a prescribed process on the image signal generated by scanner unit 60, or image data transmitted from an external device such as a PC or the like.

Information generating unit 66 obtains, in response to a device/apparatus data request signal, which will be described later, transmitted from information processing apparatus 10, device/apparatus data to be presented to information processing apparatus 10 from main body 50 and from each of the optional devices 52. The obtained device/apparatus data is transmitted as information related to specification of mounted optional device or devices 52, to information processing apparatus 10. The device/apparatus data include: main body ID and appearance image data of main body 50; IDs of optional devices 52 identifying each of optional devices 52 (paper feed cassette ID, large capacity tray ID, automatic scanner feeder ID and paper discharge device ID); and appearance image data of each of optional devices 52. In the following, the main body ID and IDs of optional devices 52 may simply be referred to as "ID or IDs of image forming apparatus 12."

Further, in response to device/apparatus state confirmation data request signal, which will be described later, transmitted from information processing apparatus 10, information generating unit 66 obtains device/apparatus state confirmation data to be presented to information processing apparatus 10 from main body 50 and from each of the optional devices 52. The obtained device/apparatus state confirmation data is transmitted to information processing apparatus 10. The device/apparatus state confirmation data includes device/apparatus state data that must be confirmed for smooth execution of the print job, including remaining amount and size of recording paper held in cassette 70 or tray 72, type of each device, model name and functions of each device, remaining amount of toner and so on.

Image forming apparatus 12 is connected to network 16 through NIC 68, and it is capable of communication with information processing apparatus 10 on the network 16.

(Optional Devices 52)

At prescribed positions of main body 50, cassette 70, tray 72, automatic scanner feeder 74 and paper discharge device 76 are connected as optional devices 52.

Cassette 70 holds sheets of recording paper, and feeds the sheet of recording paper to paper feed unit 62 of main body 50. In the present embodiment, cassette 70 includes two cassettes holding sheets of recording paper of different sizes, and the cassettes are arranged aligned one above the other.

Tray 72 holds a large amount of recording paper, and feeds the sheet of recording paper to paper feed unit 62 of main body 50.

Automatic scanner feeder 74 automatically feeds a plurality of documents placed on a document tray, not shown, one by one to scanner unit 60 at the time of copying or scanning the documents.

Paper discharge device 76 performs a prescribed process on the sheet or sheets of recording paper on which image has been formed, and then, feeds the sheet or sheets to a discharge tray, not shown. The prescribed process includes punching a hole for collecting sheets of recording paper, stapling the sheets of paper, or sorting the sheets of paper according to size or the like.

Each of the optional devices 52 is provided with a CPU for controlling an operation of each optional device 52, and a memory for storing ID of each optional device 52, appearance image data of optional device 52 itself, and device/apparatus state data representing device state of each optional device 52.

(Software Configuration)

[Information Processing Apparatus 10]

As described above, the printer driver stored in HDD 28 of information processing apparatus 10 is programmed such that a print job of image forming apparatus 12 is executed. The print job is executed through information obtaining function, determining function, displaying function and the like realized by coordination of hardware and program, by a computer including CPU 22 substantially forming the information processing apparatus 10, controlling operations of information processing apparatus 10 and image forming apparatus 12 in accordance with the program of the printer driver described above.

The information obtaining function refers to the function of obtaining, from image forming apparatus 12, device/apparatus data as the information related to specification of optional device mounted on the terminal. The determining function refers to the function of determining, based on the obtained device/apparatus data, whether there is any optional device 52 of which specification has been changed. The display function refers to the function of displaying, when it is determined by the determining function that there is an optional device 52 of which specification has been changed, the appearance image of image forming apparatus 12 and displaying, in a pulsating manner, appearance image of the optional device 52 of which specification is determined to be changed, on display 40 of information processing apparatus 10. The display in pulsating manner refers to display of the image with its attribute changed with time, of which details will be described later.

Figure 4:
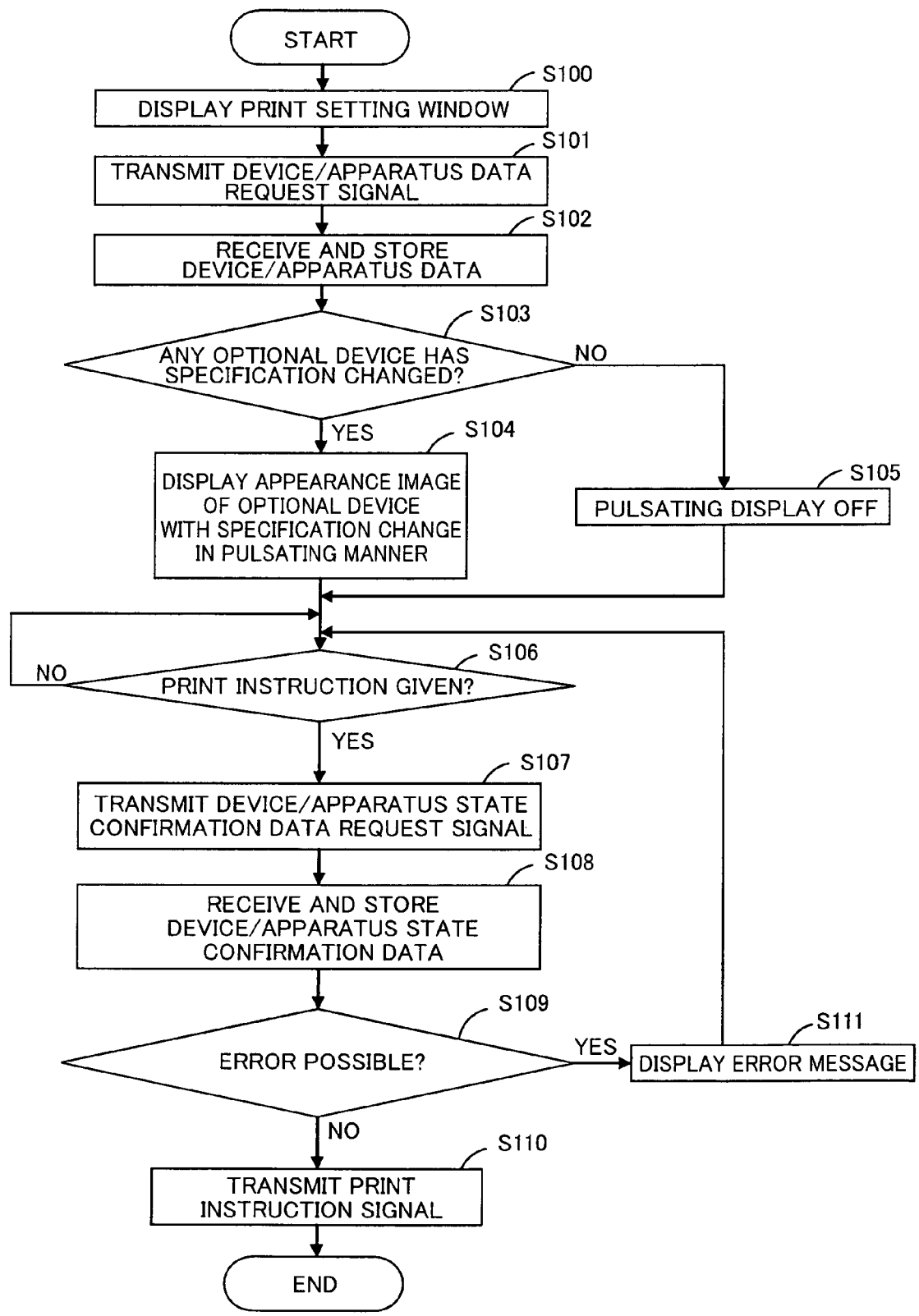
FIG. 4 is a flowchart showing a program structure for executing a print job of the image forming apparatus, in the printer driver.

Referring to FIG. 4, the program for executing a print job of image forming apparatus 12 is activated by an instruction given by an input operation by a user, using mouse 38, keyboard 42 or the like. The program includes a step 100 of displaying a print setting window on display 40, a step 101 of transmitting a device/apparatus data request signal requesting transmission of device/apparatus data, to image forming apparatus 12 through NIC 34 and network 16, and a step 102 following step 101, of receiving the device/apparatus data transmitted in response to the device/apparatus data request signal through NIC 34 and network 16, and storing the same in RAM 26.

The program further includes a step 103 of reading device/apparatus data stored in HDD 28 in relation to the ID of image forming apparatus 12 at the time of last activation of printer driver from HDD 28 to RAM 26, comparing the read data with the latest device/apparatus data stored in RAM 26, determining whether there is any optional device 52 of which specification has been changed, and branching control flow in accordance with the result of determination. Here, change in specification of the optional device 52 means that the device is exchanged to one different from the last used one, removed, or newly added.

The program further includes a step 104 executed if it is determined at step 103 that there is an optional device 52 of which specification has been changed (determination of YES), that is, when latest IDs of various optional devices 52 stored in RAM 26 includes, as compared with those stored at the time of last activation of the printer driver, a different ID, a missing ID, or a newly stored ID, of displaying, on the print setting window, appearance image of main body 50 and appearance images of optional devices 52 of which specifications are determined to be unchanged in a normal manner, and displaying an appearance image of the optional device 52 of which specification is determined to be changed, in a pulsating manner. In the present embodiment, the display in normal manner means display of an image with its size kept constant, while display in pulsating manner means display of the image with its size, as one attribute of the image, changed with time.

The program further includes a step 105 executed if it is determined at step 103 that there is no optional device of which specification has been changed (determination of NO), that is, when latest IDs of various optional devices 52 stored in RAM 26 all match the IDs stored at the time of last activation of the printer driver, of displaying on the print setting window, appearance image of main body 50 and appearance images of all optional devices 52 of image forming apparatus 12 not in the pulsating manner but in the normal manner, and a step 106 of monitoring a user input operation of an "OK" button on the print setting window, and thereby determining whether or not a print instruction is given. If it is determined at step 106 that print instruction is not given (determination of NO), step 106 is repeated until print instruction is given.

The program further includes a step 107 executed if it is determined at step 106 that print instruction has been given (determination of YES), that is, when the input of OK button is confirmed, of transmitting a device/apparatus state confirmation data request signal, requesting transmission of device/apparatus state confirmation data, to image forming apparatus 12 through NIC 34 and network 16, a step 108 executed after step 107, of receiving the device/apparatus state confirmation data transmitted in response to the device/apparatus state confirmation data request signal, from image forming apparatus 12 through NIC 34 and network 16, storing the same in RAM 26, and further storing the same with device/apparatus data including the ID of image forming apparatus 12 in HDD 28, and a step 109 of determining whether or not there is a possibility of error at the execution of print job based on the received device/apparatus state confirmation data, and branching control flow in accordance with the result of determination.

The program further includes a step 110 executed if it is determined at step 109 that there is no possibility of error (determination of NO), of transmitting a print instruction signal notifying issuance of print instruction to image forming apparatus 12 through NIC 34 and network 16 and causing execution of the print job, and a step 111 executed if it is determined at step 109 that there is a possibility of error (determination of YES), of displaying an error message notifying the possibility of error, such as "paper empty" or "toner supply is low", on display 40. After the process of step 111, the control proceeds to step 106 at which user input operation is again monitored and whether print instruction has been given or not is determined.

[Image Forming Apparatus 12]

Storage unit 58 of image forming apparatus 12 stores a computer program that realizes the print job of image forming apparatus 12. The print job is attained by control unit 54 in image forming apparatus 12 controlling the operation of image forming apparatus 12 in accordance with the computer program.

Figure 5:
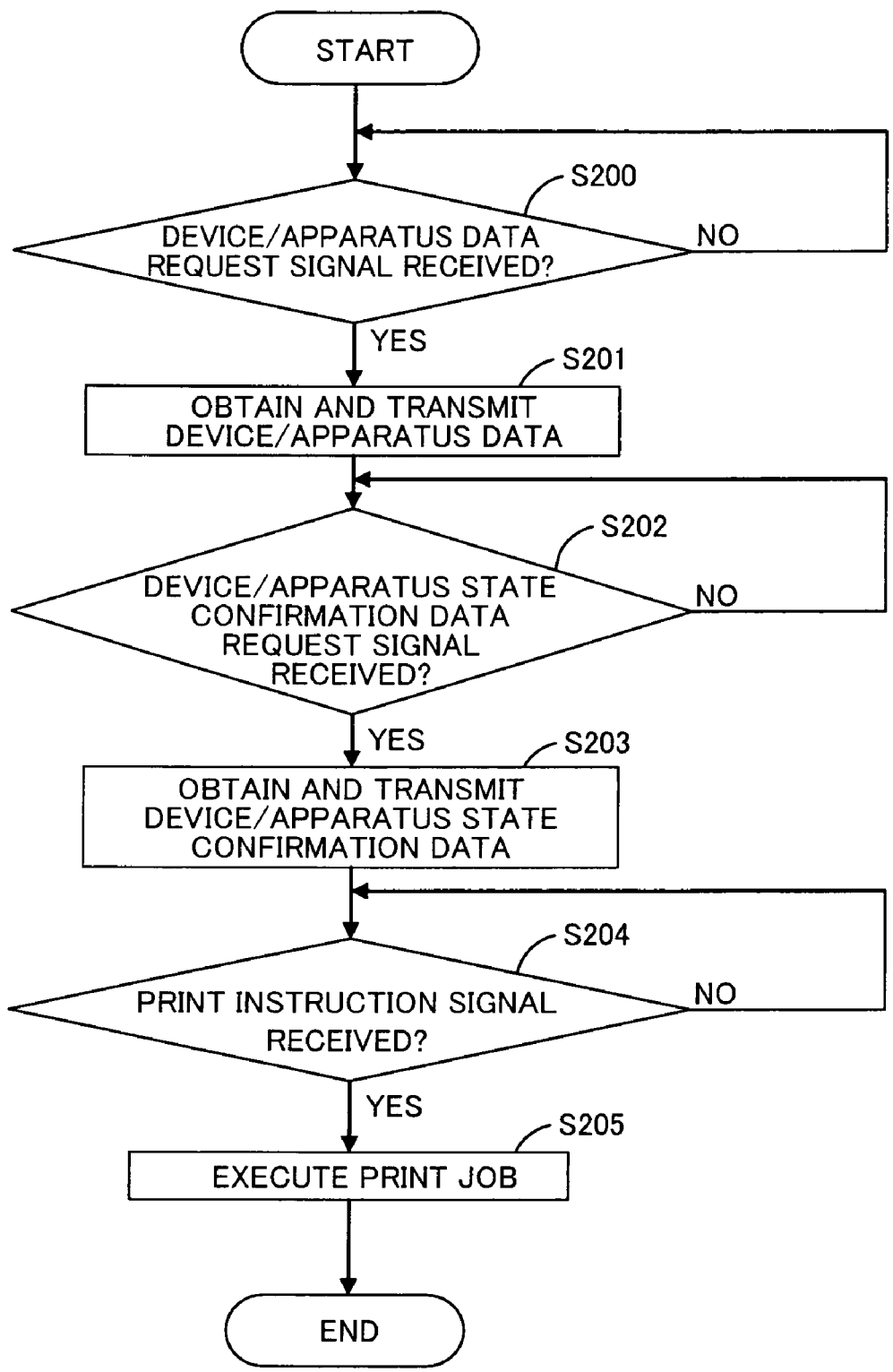
FIG. 5 is a flowchart showing a program structure for realizing a print job of the image forming apparatus.

Referring to FIG. 5, the program for realizing the print job of image forming apparatus 12 is activated when, for example, the user turns on the power of image forming apparatus 12.

The program includes a step 200 of monitoring NIC 68, determining whether or not NIC 68 has received the device/apparatus data request signal transmitted from information processing apparatus 10 through network 16, and branching control flow dependent on the result of determination. If it is determined at step 200 that the device/apparatus data request signal is not received (determination of NO), step 200 is repeated until reception is determined.

The program further includes a step 201 executed if it is determined at step 200 that the device/apparatus data request signal has been received (determination of YES), of obtaining, in response to the received device/apparatus data request signal, the device/apparatus data to be presented to information processing apparatus 10 from main body 50 and each of the optional devices 52, and transmitting the obtained device/apparatus data to information processing apparatus 10 through NIC 68 and network 16, and a step 202 of monitoring NIC 68, determining whether or not NIC 68 has received the device/apparatus state confirmation data request signal transmitted from information processing apparatus 10 through network 16 and branching control flow dependent on the result of determination. If it is determined at step 202 that the device/apparatus state confirmation data request signal is not received (determination of NO), step 202 is repeated until reception is determined.

The program further includes a step 203 executed if it is determined at step 202 that the device/apparatus state confirmation data request signal has been received (determination of YES), of obtaining, in response to the received device/apparatus state confirmation data request signal, the device/apparatus state confirmation data to be presented to information processing apparatus 10 from main body 50 and each of the optional devices 52, and transmitting the obtained device/apparatus state confirmation data to information processing apparatus 10 through NIC 68 and network 16, and a step 204 of monitoring NIC 68 and determining whether or not NIC 68 has received a print instruction signal transmitted from information processing apparatus 10 through network 16 and branching control flow dependent on the result of determination. If it is determined at step 204 that the print instruction signal is not received (determination of NO), step 204 is repeated until reception is determined.

The program further includes a step 205 executed if it is determined at step 204 that the print instruction signal is received (determination of YES), of executing the print job by controlling operations of various portions of main body 50 and optional devices 52 of image forming apparatus 12, and forming a desired image on a sheet of recording paper.

In the following, with reference to FIGS. 6 to 13, the display in pulsating manner, used for notifying change in specification of optional device 52 will be described in detail.

In the following, the display of an appearance image of cassette 70 in pulsating manner, when specification of cassette 70 is changed, will be described with reference to FIGS. 6 and 7. The display in pulsating manner of other optional device 52 when specification of other optional device 52 (tray 72, automatic scanner feeder 74 or paper discharge device 76) is changed is similar to the display in pulsating manner when specification of cassette 70 is changed, except that the portion to be displayed in the pulsating manner is different (see FIGS. 8 to 13). Therefore, detailed description thereof will not be repeated.

Figure 6:
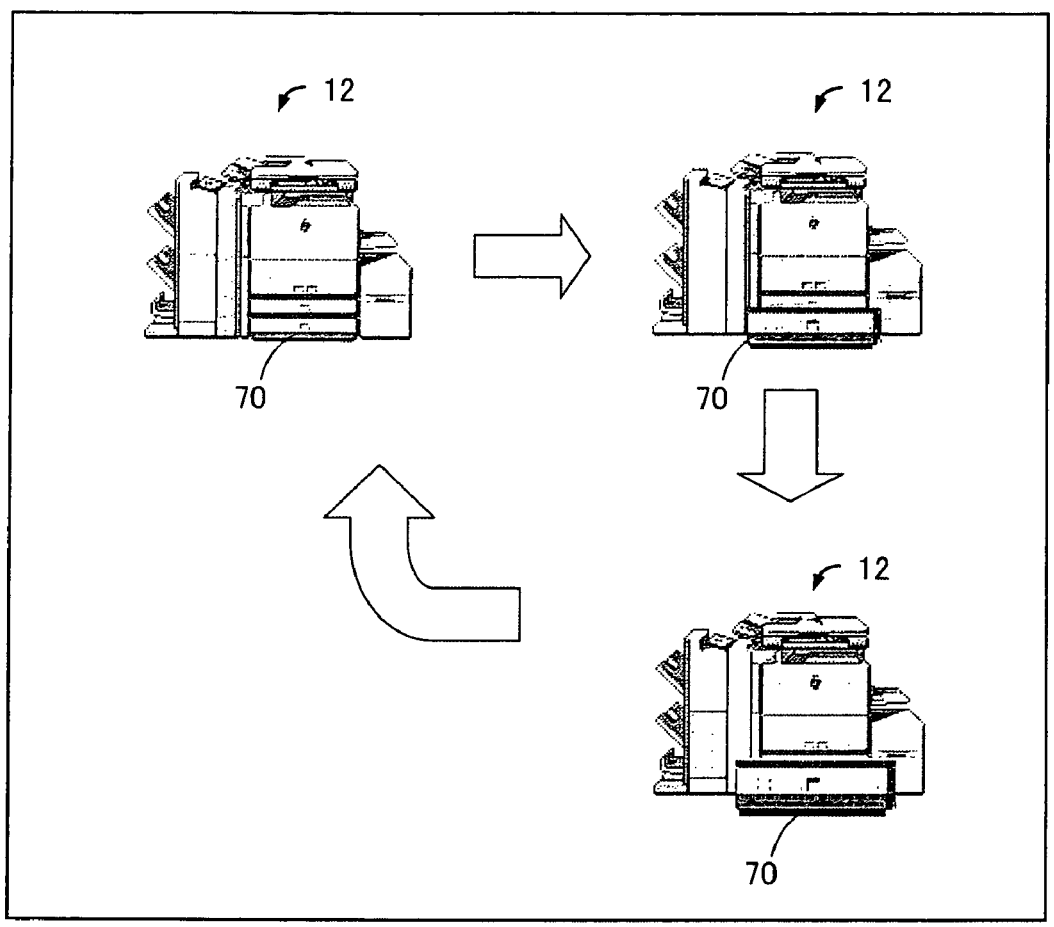
FIGS. 6 and 7 are illustrations showing the manner of pulsating display of the appearance image of a paper feed cassette, when specification of the paper feed cassette is changed.
Figure 7:
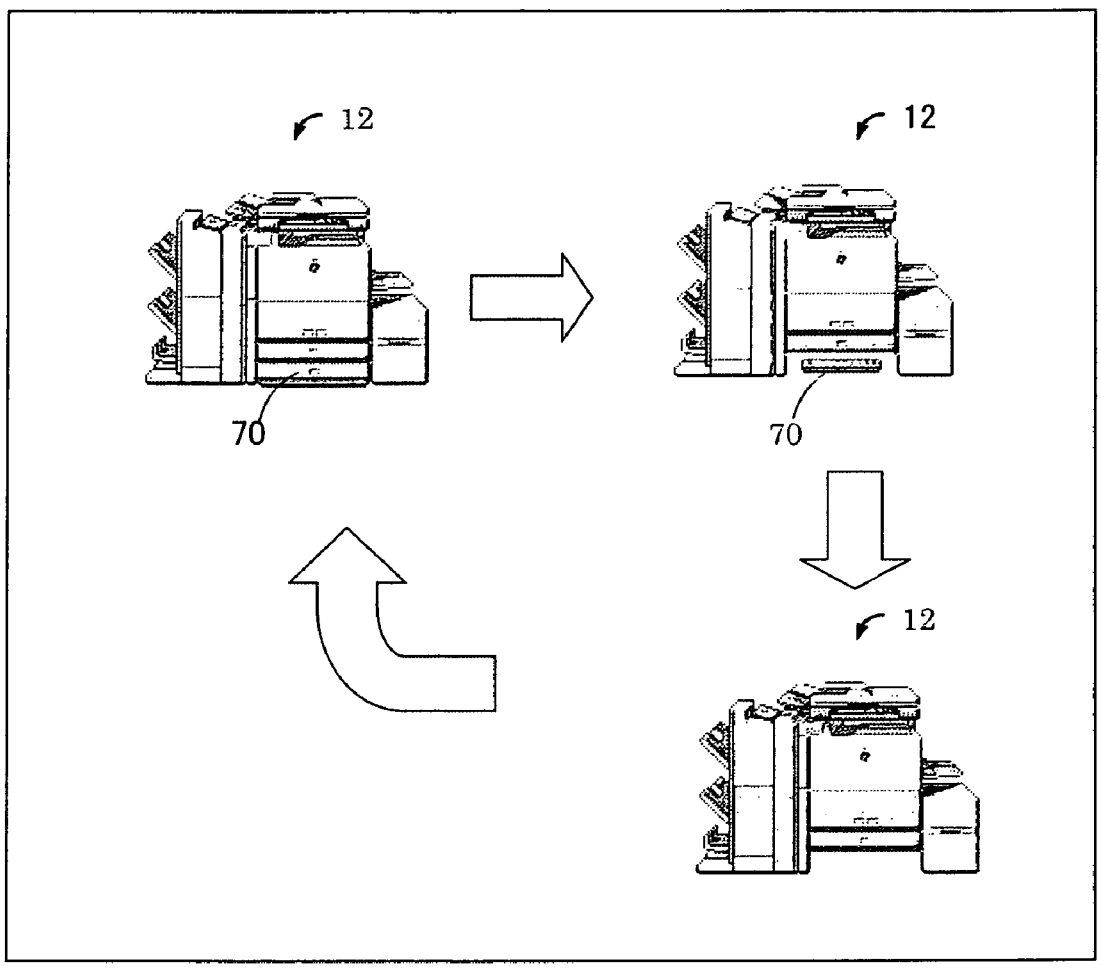
Figure 8:
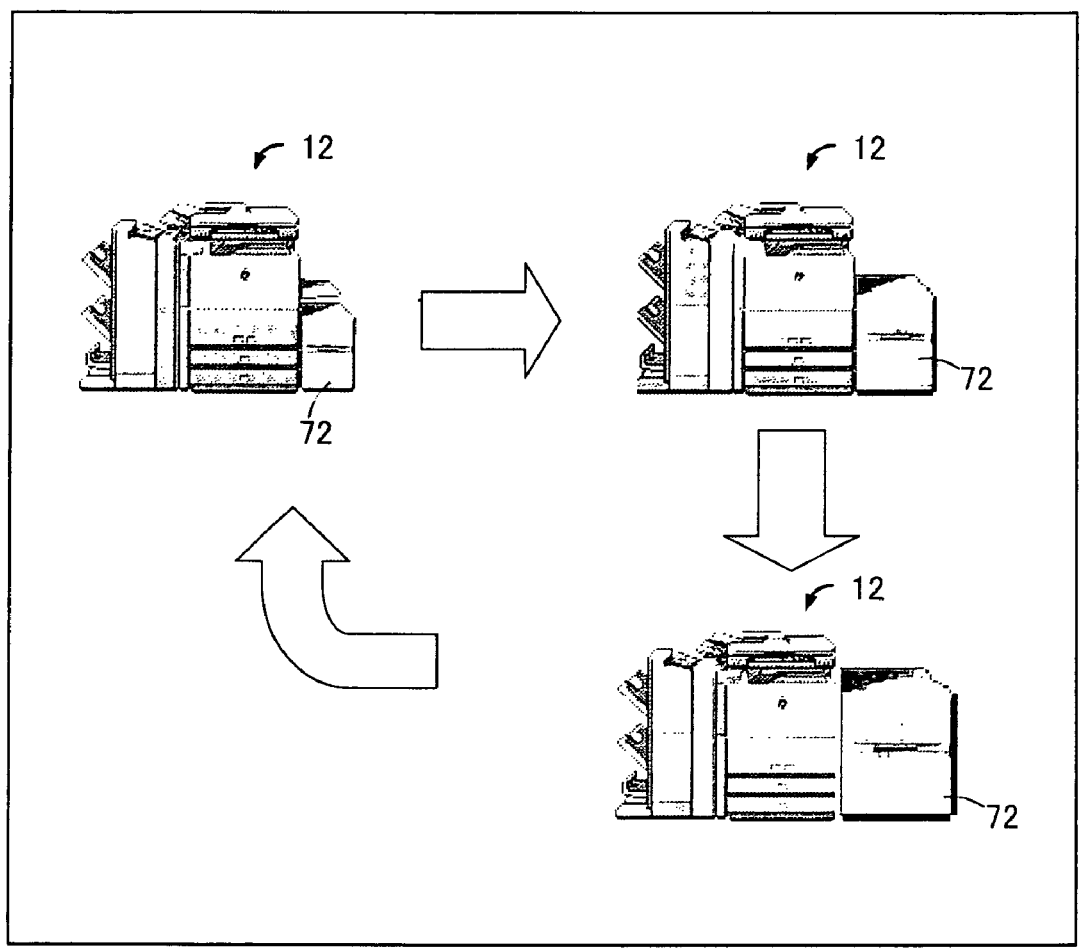
FIGS. 8 and 9 are illustrations showing the manner of pulsating display of the appearance image of a large capacity tray, when specification of the large capacity tray is changed.
Figure 9:
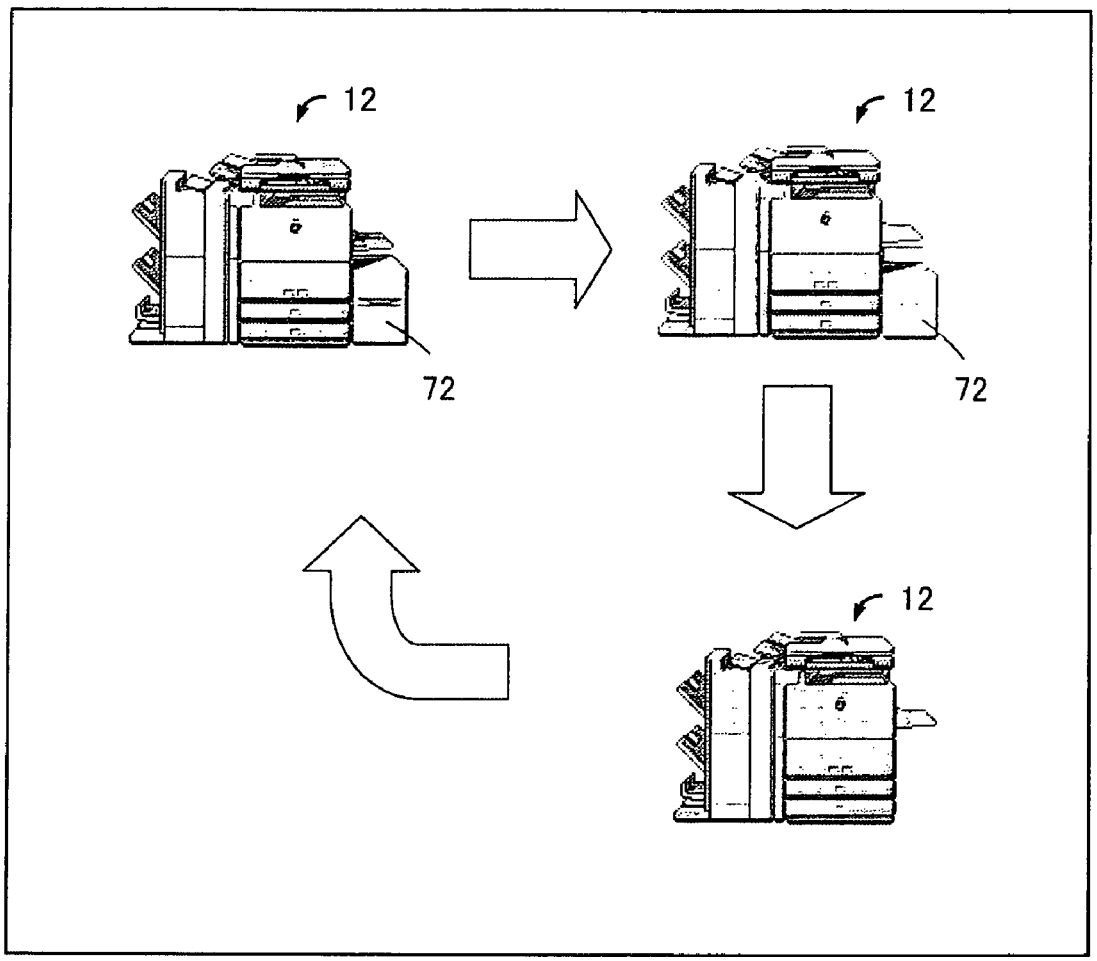
Figure 10:
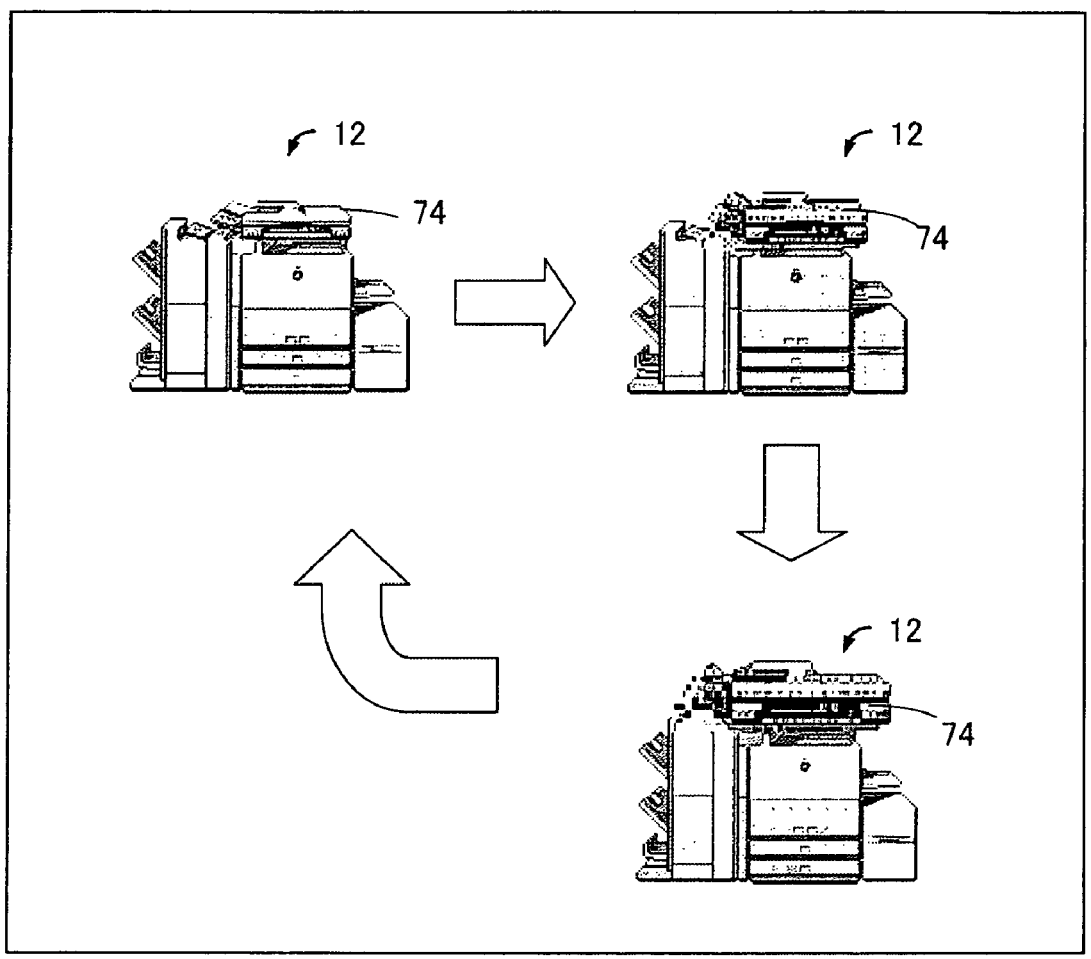
FIGS. 10 and 11 are illustrations showing the manner of pulsating display of the appearance image of an automatic scanner feeder, when specification of the automatic scanner feeder is changed.
Figure 11:
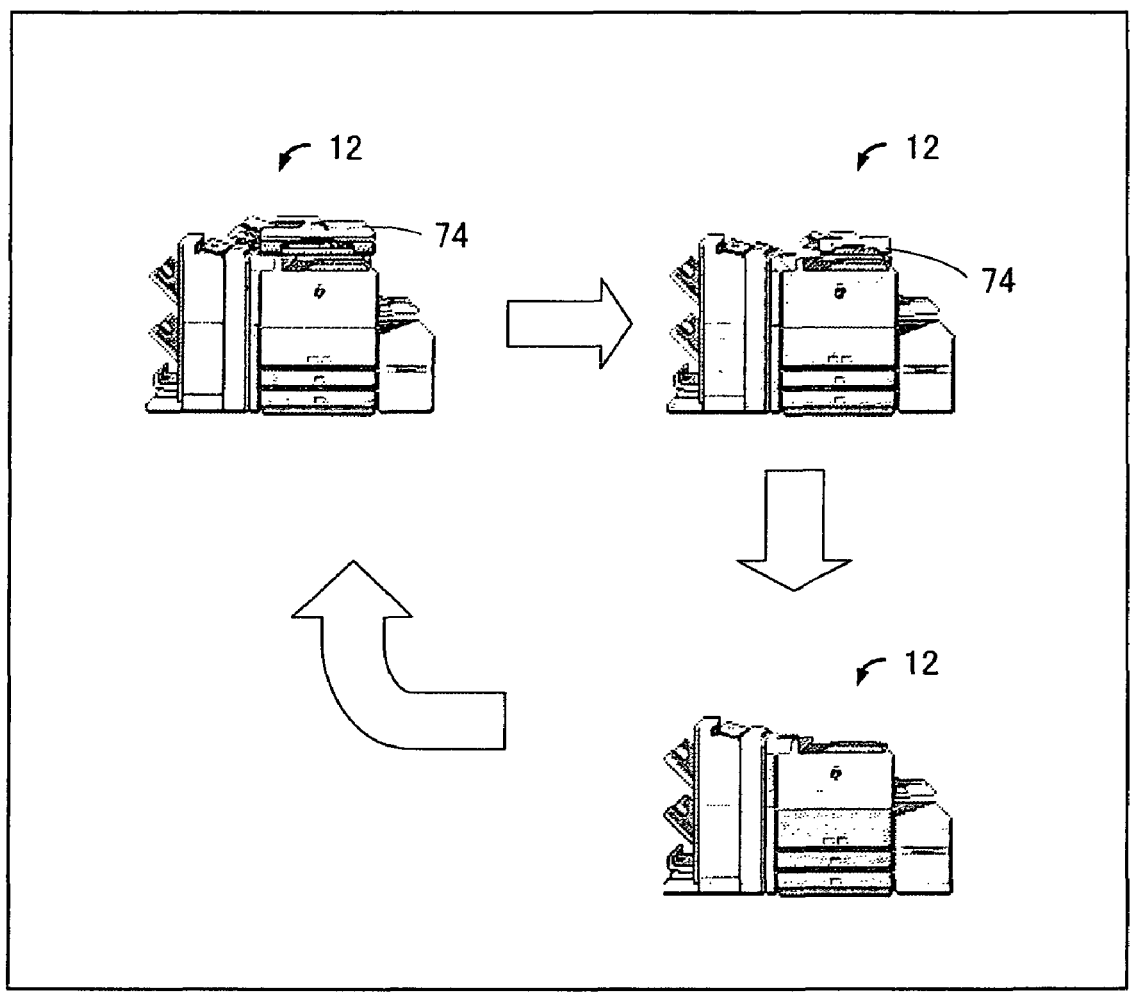
Figure 12:
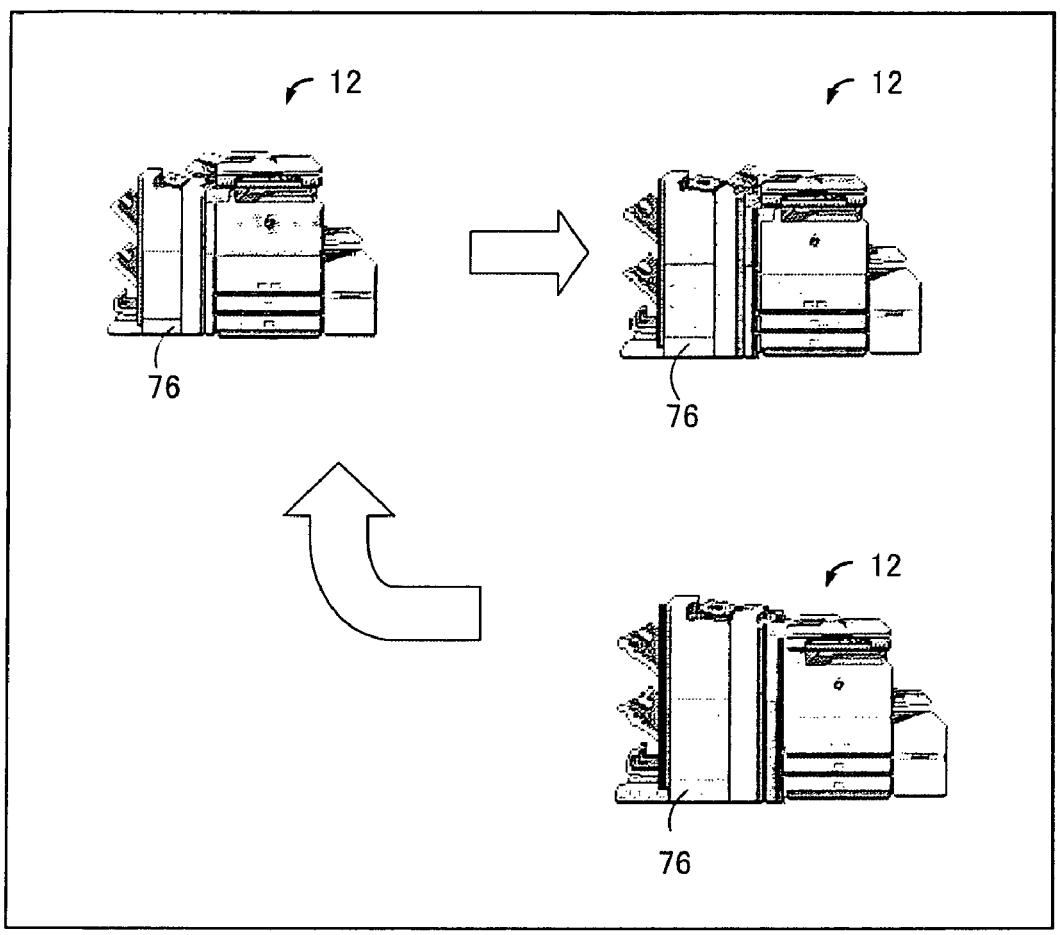
FIGS. 12 and 13 are illustrations showing the manner of pulsating display of the appearance image of a paper discharge device, when specification of the paper discharge device is changed.
Figure 13:
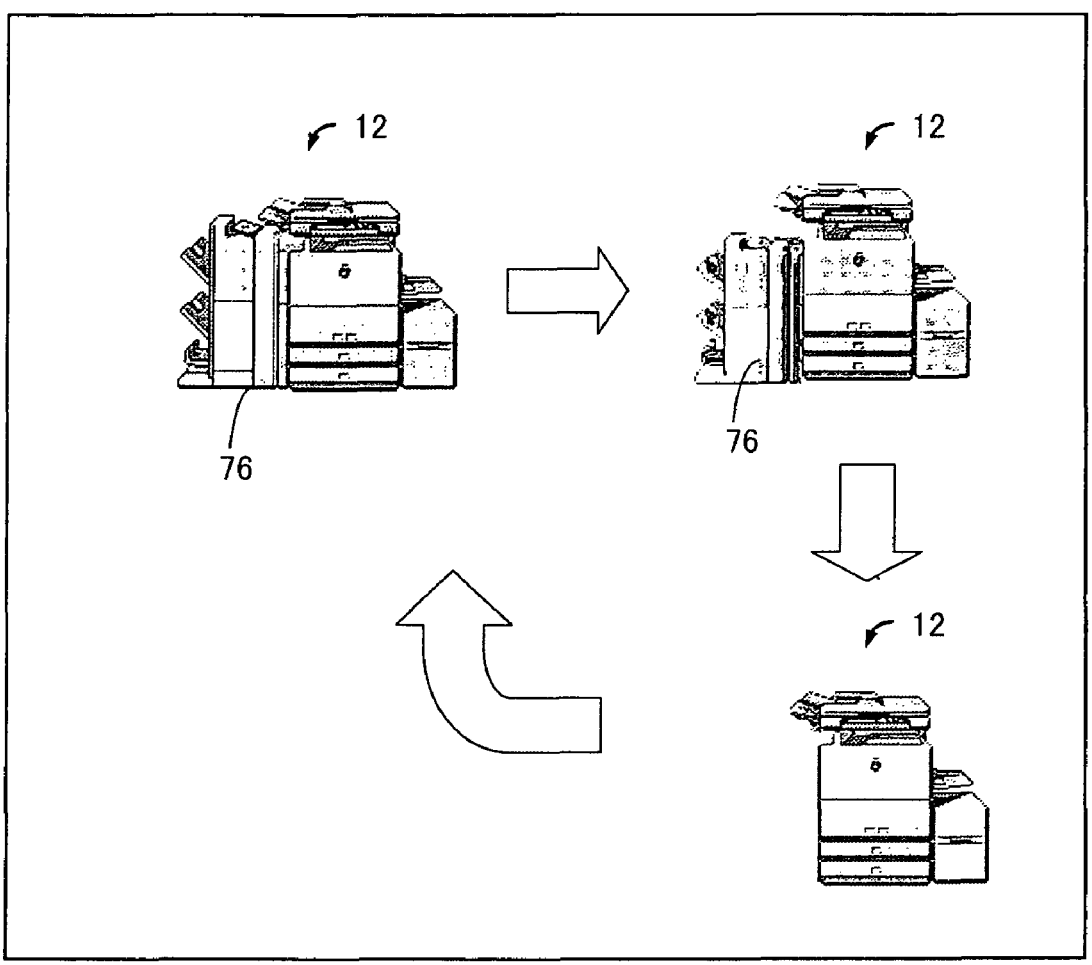

Referring to FIG. 6, when cassette 70 is exchanged to one different from that used last time, or when it is newly added, appearance image of cassette 70 is displayed in the pulsating manner as follows. Specifically, the size of appearance image of cassette 70 displayed on display 40 (hereinafter the image may also be referred to as "displayed image") is gradually increased with time, at a prescribed rate from a standard size shown on the upper left portion of FIG. 6 to the prescribed size shown on the lower right portion of FIG. 6, and the series of display operations shown in FIG. 6 is repeated at every prescribed time period. The prescribed size mentioned above is such a size that the user visually recognizes noticeable change in size of the displayed image. Preferably, the prescribed size is 1.2 to 2.0 times larger in area than the displayed image of standard size shown on the upper left portion of FIG. 6.

Further, the prescribed rate mentioned above (hereinafter referred to as "rate of increase") is such a rate that the user recognizes noticeable change in size of the displayed image. Preferable rate of increase is 1.1 times/sec. to 1.5 times/sec. from the area of the displayed image of standard size shown on the upper left portion of FIG. 6.

The time interval of change in size of the displayed image, that is, the time interval of pulsation, is set to such a time period that the user visually recognizes noticeable change in size of the displayed image. Preferable time interval is 0.5 to 2.0 seconds.

On the other hand, referring to FIG. 7, when paper feed cassette 70 is removed, the appearance image of paper feed cassette 70 is displayed in the pulsating manner as follows. Specifically, the size of appearance image of paper feed cassette 70 displayed on display 40 is gradually made smaller with time at a prescribed rate from a standard size shown on the upper left portion of FIG. 7 until it disappears as shown at the lower right portion of FIG. 7, and the series of display operations shown in FIG. 7 is repeated at every prescribed time period. Here, the prescribed rate mentioned above (hereinafter referred to as "rate of decrease") is such a rate that the user recognizes noticeable change in size of the displayed image. Preferable rate of decrease is 0.8 times/sec. to 0.5 times/sec. with respect to the size of displayed image of the standard size shown on the upper left portion of FIG. 7.

The time interval of change in size of the displayed image, that is, the time interval of pulsation, is set to such a time period that the user visually recognizes noticeable change in size of the displayed image. Preferable time interval is 0.5 to 2.0 seconds.

<Operation>

Information processing apparatus 10 and image forming apparatus 12 in accordance with the present embodiment operate in the following manner. First, the user selects document data or the like to be printed, by an input operation using mouse 38, keyboard 42 or the like, and inputs an instruction to activate the printer driver. When the instruction is input, a print setting window provided by the printer driver appears on display 40. When the printer driver is activated, CPU 22 automatically transmits a device/apparatus data request signal requesting transmission of device/apparatus data to image forming apparatus 12 through NIC 34 and network 16.

Control unit 54 constantly monitors NIC 68. If it is determined by control unit 54 that the device/apparatus data request signal from information processing apparatus 10 is received, information generating unit 66 obtains, in response to the received device/apparatus data request signal, the device/apparatus data to be presented to information processing apparatus 10 from main body 50 and each of the optional devices 52. Then, the obtained data is transmitted to information processing apparatus 10 through NIC 68 and network 16.

Receiving the device/apparatus data transmitted from information generating unit 66, CPU 22 stores the received device/apparatus data in RAM 26. Further, CPU 22 reads device/apparatus data stored at the time of last activation of printer driver from HDD 28 to RAM 26.

CPU 22 compares the latest device/apparatus data and the last device/apparatus data, both stored in RAM 26, to determine whether there is any optional device 52 of which specification has been changed.

If it is determined that there is an optional device 52 of which specification has been changed, that is, when there is a different ID, a missing ID, a newly stored ID or the like among the latest IDs of various optional devices stored in RAM 26 as compared with the IDs stored at the time of last activation of printer driver, CPU 22 displays, on the print setting window, the appearance image of main body 50 of image forming apparatus 12 and appearance image or images of optional device or devices 52 of which specifications are determined to be unchanged in a normal manner, and displays an appearance image of the optional device 52 of which specification is determined to be changed in the pulsating manner. On the other hand, if it is determined that there is no optional device of which specification has been changed, that is, when the latest IDs of various optional devices stored in RAM 26 all match the IDs stored at the time of last activation of printer driver, CPU 22 displays the appearance images of main body 50 and all optional devices 52 of image forming apparatus 12 not in the pulsating manner but in the normal manner, on the print setting window.

The user confirms the display operation of appearance images of main body 50 and optional devices 52 of image forming apparatus 12 on the print setting window, to recognize the state of change in the specification of the optional devices 52. If there is no problem in print setting or the like, the user clicks the OK button on the print setting window using, for example, a mouse, to input a print instruction.

CPU 22 always monitors the user input operation of the OK button on the print setting window. If it is determined that a print instruction has been given, CPU 22 transmits a device/apparatus state confirmation data request signal requesting transmission of device/apparatus state confirmation data, to image forming apparatus 12 through NIC 34 and network 16.

If it is determined by control unit 54 constantly monitoring NIC 68 that the device/apparatus state confirmation data request signal from information processing apparatus 10 is received, information generating unit 66 obtains, in response to the received device/apparatus state confirmation data request signal, the device/apparatus state confirmation data to be presented to information processing apparatus 10 from main body 50 and each of the optional devices 52. Then, it transmits the obtained device/apparatus state confirmation data to information processing apparatus 10 through NIC 68 and network 16.

Receiving the device/apparatus state confirmation data transmitted from information generating unit 66, CPU 22 stores the received device/apparatus state confirmation data in RAM 26. Further, CPU 22 has the received device/apparatus state confirmation data stored, together with device/apparatus data including the ID of image forming apparatus 12, in HDD 28. The device/apparatus data stored in HDD 28 are used for checking any change in specification of the optional devices, at the time of next printing.

Based on the device/apparatus state confirmation data stored in RAM 26, CPU 22 determines whether or not there is a possibility of error generated during execution of a print job. If it is determined that there is no possibility of error, it transmits a print instruction signal notifying that a print instruction has been given, to image forming apparatus 12 through NIC 34 and network 16. If it is determined that error is possible, it causes display 40 to display an error message such as "paper empty", "toner supply is low", or the like notifying the possibility of error, and thereafter, again monitors a user input operation to determine whether or not a print instruction is given.

If it is determined that a print instruction signal from information processing apparatus 10 is received, control unit 54 controls operations of various portions in main body 50 and optional device or devices 52 of image forming apparatus 12 to execute a print job, whereby a desired image is formed on a sheet of recording paper.

In this manner, on display 40, the appearance image of each optional device 52 of which specification is determined to be changed is repeatedly displayed in a pulsating manner with its size gradually made larger or smaller with time to a prescribed size at a prescribed rate. Therefore, the optional device 52 of which specification has been changed is displayed in a highly visible, emphasized manner. As a result, the user can easily recognize that the specification of optional device 52 has been changed.

[Modification]

Figure 14:
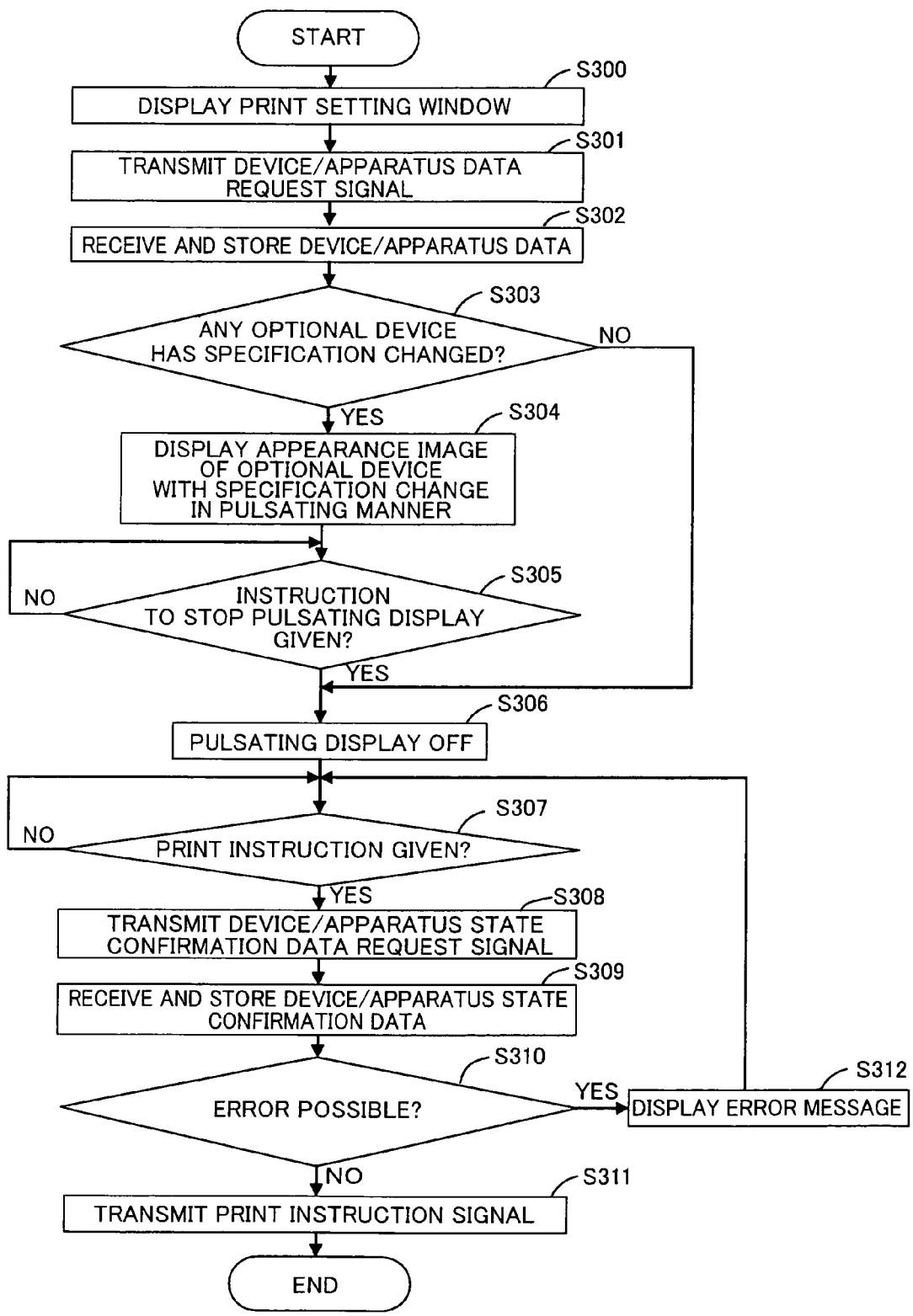
FIG. 14 is a flowchart representing a modification to the program structure for executing a print job of the image forming apparatus.

Referring to FIG. 14, a program for executing a print job of image forming apparatus 12 is activated by an instruction given by a user input operation using mouse 38, keyboard 42 or the like. The program includes a step 300 of displaying a print setting window on display 40, a step 301 of transmitting a device/apparatus data request signal requesting transmission of device/apparatus data to image forming apparatus 12 through NIC 34 and network 16, and a step 302 following step 301 of receiving device/apparatus data transmitted, in response to the device/apparatus data request signal, from image forming apparatus 12 through NIC 34 and network 16, and storing the data in RAM 26.

The program further includes a step 303 of reading device/apparatus data stored in HDD 28 together with the ID of image forming apparatus 12 at the time of last activation of printer driver to RAM 26, comparing the data with the latest device/apparatus data stored in RAM 26, and determining whether there is any optional device 52 of which specification has been changed.

The program further includes a step 304 executed if it is determined at step 303 that there is an optional device 52 of which specification has been changed (determination of YES), that is, if it is determined that there is a different ID, a missing ID or a newly stored ID among the latest IDs of various optional devices stored in RAM 26, as compared with the IDs stored at the time of last activation of printer driver, of displaying, on the print setting window, the appearance image of main body 50 of image forming apparatus 12 and appearance image or images of optional device or devices 52 of which specifications are determined to be unchanged in a normal manner, and displaying an appearance image of the optional device 52 of which specification is determined to be changed in a pulsating manner, and a step 305 of monitoring a user input operation with respect to the appearance image of optional device 52 displayed in the pulsating manner on the print setting window, to determine whether or not an instruction to stop pulsating display is given. If it is determined at step 305 that the instruction to stop pulsating display is not given (determination of NO), step 305 is repeated until the instruction to stop pulsating display is given.

The program further includes a step 306 executed if it is determined at step 305 that the instruction to stop pulsating display is given (determination of YES), that is, when an input such as a click of mouse 38 on a portion of appearance image of optional device 52 displayed in the pulsating manner is confirmed, or if it is determined at step 303 that there is no optional device of which specification has been changed (determination of NO), that is, if the latest IDs of various optional devices stored in RAM 26 all match the IDs stored at the time of last activation of printer driver, of displaying on the print setting window, appearance image of main body 50 and appearance images of all optional devices 52 of image forming apparatus 12 not in the pulsating manner but in the normal manner. If step 306 is executed after steps 304 and 305, the appearance image of optional device 52 of which specification has been changed is first displayed in the pulsating manner and after the user clicks a portion of the appearance image of the optional device 52, the display is returned to the normal display.

The program further includes a step 307 of monitoring a user input operation of the OK button on print setting window to determine whether or not a print instruction is given, and branching control flow dependent on the result of determination. If it is determined at step 307 that print instruction is not given (determination of NO), step 307 is repeated until a print instruction is given.

The program further includes a step 308 executed if it is determined at step 307 that a print instruction is given (determination of YES), that is, if an input from OK button is confirmed, of transmitting a device/apparatus state confirmation data request signal requesting transmission of device/apparatus state confirmation data to image forming apparatus 12 through NIC 34 and network 16, a step 309 following step 308, of receiving the device/apparatus state confirmation data transmitted in response to the device/apparatus state confirmation data request signal, from image forming apparatus 12 through NIC 34 and network 16, storing the data in RAM 26, and further storing the data with device/apparatus data including the ID of image forming apparatus 12, in HDD 28, a step 310 of determining, based on the received device/apparatus state confirmation data, whether or not there is a possibility of error during execution of a print job, and branching control flow dependent on the result of determination, a step 311 executed if it is determined at step 310 that there is no possibility of error (determination of NO), of transmitting a print instruction signal notifying issuance of print instruction to image forming apparatus 12 through NIC 34 and network 16 and causing execution of the print job, and a step 312 executed if it is determined at step 310 that there is a possibility of error (determination of YES), of displaying an error message notifying the possibility of error, such as "paper empty" or "toner supply is low", on display 40. After the process of step 312, the control proceeds to step 307 at which user input operation is again monitored and whether print instruction has been given or not is determined.

<Operation>

Information processing apparatus 10 and image forming apparatus 12 in accordance with the present modification operate in the following manner. First, the user selects document data or the like to be printed, by an input operation using mouse 38, keyboard 42 or the like, and inputs an instruction to activate the printer driver. When the instruction is input, a print setting window provided by the printer driver appears on display 40. When the printer driver is activated, CPU 22 automatically transmits a device/apparatus data request signal requesting transmission of device/apparatus data to image forming apparatus 12 through NIC 68 and network 16.

Control unit 54 constantly monitors NIC 68. If it is determined by control unit 54 that the device/apparatus data request signal from information processing apparatus 10 is received, information generating unit 66 obtains, in response to the received device/apparatus data request signal, the device/apparatus data to be presented to information processing apparatus 10 from main body 50 and each of the optional devices 52. Then, the obtained data is transmitted to information processing apparatus 10 through NIC 34 and network 16.

Receiving the device/apparatus data transmitted from information generating unit 66, CPU 22 stores the received device/apparatus data in RAM 26.

CPU 22 reads the device/apparatus data stored together with the ID of image forming apparatus 12 from HDD 28, and compares the data with the latest device/apparatus data stored in RAM 26, to determine whether or not there is any optional device 52 of which specification has been changed.

If it is determined by CPU 22 that there is an optional device 52 of which specification has been changed, that is, when there is a different ID, a missing ID or a newly stored ID among the latest IDs of various optional devices stored in RAM 26 as compared with the IDs stored at the time of last activation of printer driver, CPU 22 displays, on the print setting window, the appearance image of main body 50 of image forming apparatus 12 and appearance image or images of optional device or devices 52 of which specifications are determined to be unchanged in a normal manner, and displays an appearance image of the optional device 52 of which specification is determined to be changed in a pulsating manner. On the other hand, if it is determined that there is no optional device of which specification has been changed, that is, when the latest IDs of various optional devices 52 stored in RAM 26 all match the IDs stored at the time of last activation of printer driver, CPU 22 displays the appearance images of main body 50 and all optional devices 52 of image forming apparatus 12, not in the pulsating manner but in the normal manner, on the print setting window.

The user confirms the display operation of appearance images of main body 50 and optional devices 52 of image forming apparatus 12 on the print setting window, to recognize the state of change in the specification of the optional devices 52. If there is any appearance image of optional device 52 that is displayed in a pulsating manner, the user clicks the appearance image of optional device 52 that is displayed in the pulsating manner, and thereby inputs an instruction to stop pulsating display.

CPU 22 constantly monitors the user input operation to the appearance image of optional device 52 that is displayed in the pulsating manner on the print setting window. If it is determined by CPU 22 that an instruction to stop pulsating display has been given, the pulsating display of appearance image of optional device 52 is stopped, and the image is displayed in the normal manner.

Thereafter, if there is no problem in print setting or the like, the user clicks the OK button on the print setting window using, for example, a mouse, to input a print instruction.

CPU 22 always monitors the user input operation of the OK button on the print setting window. If it is determine that a print instruction has been given, CPU 22 transmits a device/apparatus state confirmation data request signal requesting transmission of device/apparatus state confirmation data, to image forming apparatus 12 through NIC 34 and network 16.

Control unit 54 constantly monitors NIC 68. If it is determined by control unit 54 that the device/apparatus state confirmation data request signal from information processing apparatus 10 is received, information generating unit 66 obtains, in response to the received device/apparatus state confirmation data request signal, the device/apparatus state confirmation data to be presented to information processing apparatus 10 from main body 50 and each of the optional devices 52. Then, it transmits the obtained device/apparatus state confirmation data to information processing apparatus 10 through NIC 68 and network 16.

Receiving the device/apparatus state confirmation data transmitted from information generating unit 66, CPU 22 stores the received device/apparatus state confirmation data in RAM 26. Further, CPU 22 has the received device/apparatus state confirmation data stored together with device/apparatus data including the ID of image forming apparatus 12, in HDD 28.

Based on the device/apparatus state confirmation data stored in RAM 26, CPU 22 determines whether or not there is a possibility of error generated during execution of a print job. If it is determined that there is no possibility of error, it transmits a print instruction signal notifying that a print instruction has been given, to image forming apparatus 12 through NIC 34 and network 16. If it is determined that error is possible, it causes display 40 to display an error message, and thereafter, again monitors a user input operation to determine whether a print instruction is given or not.

If it is determined that a print instruction signal from information processing apparatus 10 is received, control unit 54 controls operations of various portions in main body 50 and optional device or devices 52 of image forming apparatus 12 to execute a print job, whereby a desired image is formed on a sheet of recording paper.

As described above, when the appearance image of an optional device 52 that is displayed in the pulsating manner is clicked by mouse 38, CPU 22 stops pulsating display of appearance image of optional device 52, and displays it in the normal manner.

In this manner, it is possible to confirm that the user is aware of the change in specification of optional device 52. As a result, the user is not confused when he/she encounters an inconvenience caused by the change in specification of the optional device 52, for example, when a certain function suddenly becomes unavailable, and the next process such as the print job, can be started smooth.

<Function/Effect>

According to the present embodiment, CPU 22 automatically obtains device/apparatus data related to the specification of optional devices 52 from image forming apparatus 12, and based on the obtained device/apparatus data, determines whether or not there is any optional device 52 of which specification has been changed. If it is determined that there is an optional device 52 of which specification has been changed, CPU 22 displays, on the print setting window, an appearance image of the optional device 52 of which specification is determined to be changed, in a pulsating manner.

Consequently, the optional device of which specification has been changed comes to be displayed in a highly visible, emphasized manner and, therefore, the user, particularly, a user having difficulty in determining color difference because of some defect in color perception, can more easily know that the specification of the optional device 52 has been changed. Therefore, the problem that the user may be confused when he/she encounters an inconvenience caused by the change in specification of the optional device, for example, when a certain function suddenly becomes unavailable, can be avoided, so that convenience to the user can be improved, and the print job can be executed smooth.

As the network 16 used in the embodiment above, not only wired LAN but also wireless LAN may be used. Further, for pulsating display of the embodiment above, the size of displayed image changes at the same rate of increase or decrease. The rate, however, may be changed. Further, the time interval at which the size of displayed image changes is constant in the embodiment above. The present invention is not limited to such an embodiment, and the time interval of pulsating display may be varied.

Further, in the embodiment above, the pulsating display is realized by the change in size of the image of optional device 52. The present invention, however, is not limited to such an embodiment. By way of example, the pulsating display may be realized by changing display attribute or attributes of the image of optional device with time. The display attributes may include hue, chroma, brightness and luminance of the image. For instance, if the image is displayed with is size as well as its hue or chroma changed, the optional device 52 of which specification has been changed comes to be displayed in a more visible, emphasized manner and, therefore, the user can more easily know that the specification of the optional device 52 has been changed.

The hue may be changed as the displayed image changes, for example, the image of paper feed cassette 70 may be displayed in blue at the upper left portion of FIG. 6, in pink at the upper right portion of FIG. 6 and in red at the lower right portion of FIG. 6. Alternatively, the chroma may be changed as the displayed image changes, for example, the image may be displayed in blue at the upper left portion of FIG. 7 and the image may be displayed in gray at the upper right portion of FIG. 7.

The pulsating display may be realized by making different the rate of display of the image of optional devices 52 in accordance with the types of optional devices 52. Here, different rate of display means that the time interval at which the size of displayed image changes, that is, time interval of pulsating display is different, or the time period in which the image is displayed (hereinafter referred to as "display time") is different. By such an approach, the user, particularly, a user having difficulty in determining color difference because of some defect in color perception, can more easily know from the difference in display rate that the specification of the optional device 52 has been changed.

By way of example, in connection with the pulsating display of displayed images of cassette 70, tray 72, automatic scanner feeder 74 and paper discharge device 76, the user may set in advance to make longer or shorter the time interval or display time of pulsating display. Here, the degree of difference in time interval or display time of pulsating display may be such a difference that the user visually recognizes noticeable difference in the display rate. For instance, if the time interval or display time of pulsating display is made longer in the above-described order, it is preferred that the time interval or display time of pulsating display is made 1.5 to 3.0 times longer than that for the previous optional device 52. If the time interval or display time of pulsating display is made shorter in the above-described order, it is preferred that the time interval or display time of pulsating display is made ¾ to ⅓ of that for the previous optional device 52.

Further, the degree of change in size or display attributes of the image of optional devices 52 may be made different in accordance with the types of optional devices 52.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An information processing apparatus performing data communication through a network with a terminal wherein a single or a plurality of optional devices are additionally mounted to said terminal, said apparatus comprising:
    an information obtaining device obtaining, from said terminal, information related to specification of an optional device having a type mounted on said terminal;
    a determining device determining, based on said obtained information, whether or not there is any optional device of which specification has been changed;
    a display displaying appearance images of said terminal and the optional device mounted on said terminal having display attributes; and
    a display processing device displaying, on said display, when it is determined by said determining device that there is said optional device of which specification has been changed, appearance image of said optional device with image size changed with time; wherein said display processing device includes a first display circuit displaying, on said display, appearance image of said optional device to repeat a display operation in which the appearance image is increased in size at a prescribed rate of increase from a standard size until it reaches a prescribed size, or the appearance image is decreased in size at a prescribed rate of decrease from a standard size until is disappears; and said prescribed size is 1.2 to 2.0 times larger than the appearance image of said standard size, said rate of increase is 1.1 times/sec. from the area of the appearance image of said standard size, said rate of decrease is 0.8 times/sec. to 0.5 times/sec. from the area of the appearance image of said standard size, and time interval of change in size of the appearance image is 0.5 to 2.0 seconds.

2. The information processing apparatus according to claim 1, wherein said display processing device further includes a second display circuit displaying, on said display, when it is determined by said determining device that there is said optional device of which specification has been changed, appearance image of said optional device with its display attribute changed along with the change in size of said appearance image.

3. The information processing apparatus according to claim 2, wherein said display processing device further includes a third display circuit displaying, on said display, when it is determined by said determining device that there is said optional device of which specification has been changed, appearance image of said optional device with a display rate determined in accordance with the type of optional device.

4. The information processing apparatus according to claim 3, wherein said terminal is an information forming apparatus; and optional device is at least any one of a paper feed cassette, a large capacity try, an automatic scanner feeder and a paper discharge device.

5. The information processing apparatus according to claim 4, further comprising:

a pointing device for performing an input operation to the information processing device; wherein said display processing device further includes a stopping circuit stopping , when the appearance image of said optional device displayed with its image size changed with time is clicked by said pointing device, display by said display of the appearance image of the optional device with its image size changed with time.

6. An information processing system comprising a terminal to which a single or a plurality of optional devices are additionally mounted; and an information processing apparatus performing data communication with said terminal through a network; wherein said information processing apparatus includes an information obtaining device obtaining, from said terminal, information related to specification of an optional device mounted on said terminal, a determining device determining, based on said obtained information, whether or not there is any optional device of which specification has been changed, a display displaying appearance images of said terminal and the optional device mounted on said terminal, and a display processing device displaying, on said display, when it is determined by said determining device that there is said optional device of which specification has been changed, appearance image of said optional device with image size changed with time; and said display processing device includes a first display circuit displaying, on said display, appearance image of said optional device to repeat a display operation in which the appearance image is increased in size at a prescribed rate of increase from a standard size until it reaches a prescribed size, or the appearance image is decreased in size at a prescribed rate of decrease from a standard size until it disappears; and said prescribed size is 1.2 to 2.0 time larger in area than the appearance image of said standard size, said rate of increase is 1.1 times/sec/ to 1.5 times/sec. from the area of the appearance image of said standard size, the rate of decrease is 0.8 times/sec. to 0.5 times/sec. from the area of the appearance image of said standard size, and time interval of change in size of the appearance image is 0.5 to 2.0 seconds; and said terminal includes an information providing device transmitting said information to said information processing apparatus.

7. A computer readable recording medium having recorded thereon a computer program in a computer performing data communication through a network with a terminal, wherein a single or a plurality of optional devices are additionally mounted to said terminal, said computer program causing said computer to function as an information processing apparatus including:

an information obtaining device obtaining, from said terminal, information related to specification of an optional device mounted on said terminal, a determining device determining, based on said obtained information, whether or not there is any optional device of which specification has been changed, and a display processing device displaying, on a display displaying appearance images of said terminal and the optional device mounted on said terminal, when it is determined by said determining device that there is said optional device of which specification has been changed, appearance image of said optional device with image size changed with time; wherein:

said display processing device includes a first display circuit displaying, on said display, appearance image of said optional device to repeat a display operation in which the appearance image is increased in size at a prescribed rate of increase from a standard size to a prescribed size, or appearance image is decreased in size at a prescribed rate of decrease from a standard size until it disappears; and said prescribed size is 1.2 to 2.0 times larger in area than the appearance image of said standard size, said rate of increase is 1.1 times/sec. to 1.5 times/sec. from the area of the appearance image of said standard size, said rate of decrease is 0.8 times/sec. to 0.5 times/sec. from the area of the appearance image of said standard size, and time interval of change in size of the appearance image is 0.5 to 2.0 seconds.

* * * * *